(No Model.)

H. G. KENNEDY.
CHART FOR DRAFTING GARMENTS.

No. 451,247. Patented Apr. 28, 1891.

Witnesses.

Inventor:
Henry G. Kennedy.
by Charles H. S. Riches.
Attorney.

UNITED STATES PATENT OFFICE.

HENRY GORMAN KENNEDY, OF BERLIN, CANADA.

CHART FOR DRAFTING GARMENTS.

SPECIFICATION forming part of Letters Patent No. 451,247, dated April 28, 1891.

Application filed August 30, 1890. Serial No. 363,512. (No model.)

*To all whom it may concern:*

Be it known that I, HENRY GORMAN KENNEDY, tailor, of the town of Berlin, in the county of Waterloo, in the Province of Ontario, Canada, have invented a certain new and useful Chart for Drafting Garments for the Use of Cutters, Tailors, and Others; and I hereby declare the following to be a full, clear, and exact description of the same.

The object of this invention is to devise an outliner of coats and vests by means of which the initial points of the outline may be marked or placed without having to resort to the use of construction-lines; and it consists, essentially, of the device hereinafter more fully explained.

Figure 1:
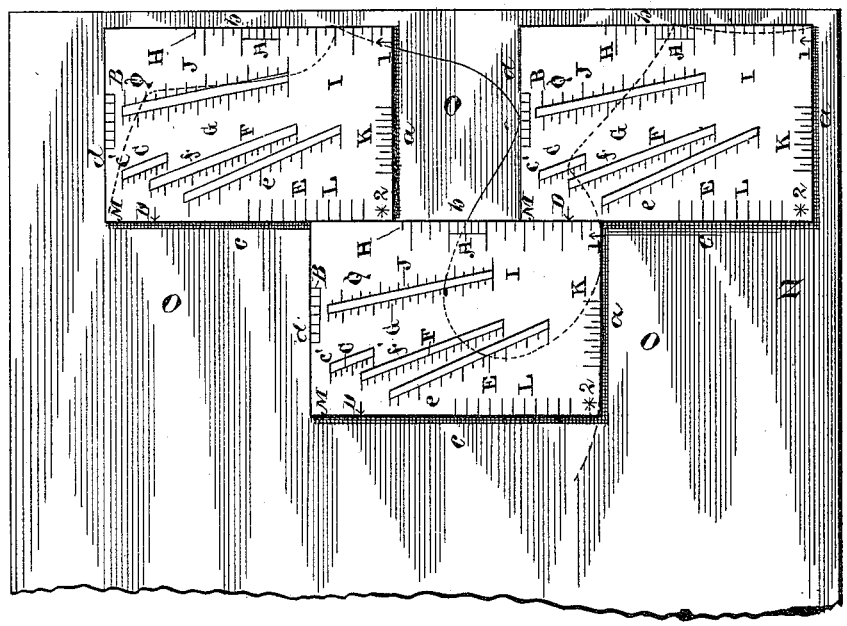
Figure 2:
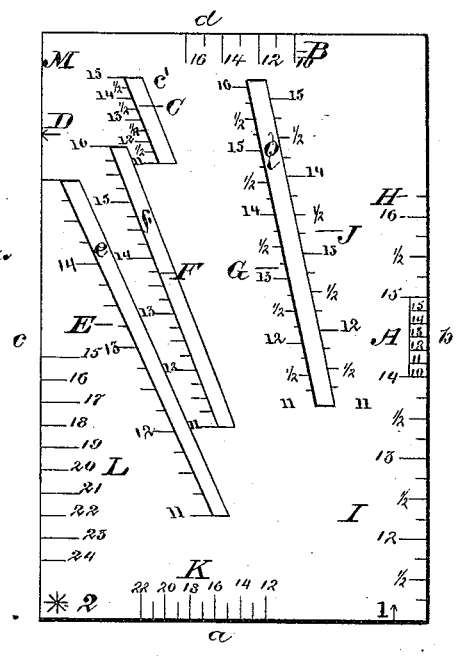
Figure 3:
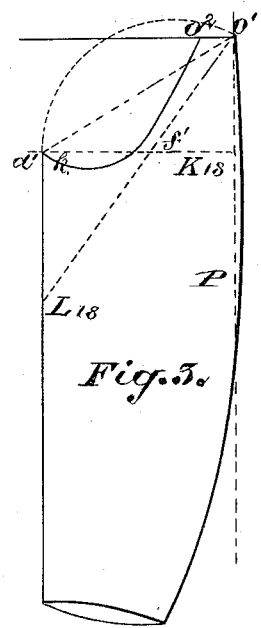

In the drawings, Figure 1 is a plan view of a piece of cloth and chart, showing the operation or position of the chart in marking the points for the width of back, lower shoulder's point, width of back at shoulder, scye, upper shoulder's point, and gorge. Fig. 3 shows the formation of the sleeve. Fig. 2 is a view of chart one-half full size.

In describing this chart it will be noticed that I have given accurate measurement of each scale and locating-point, though it may be possible to alter these measurements in making others. This chart consists of a rectangular sheet of stiffened paper or other suitable material, nine inches long by six inches wide. On the lower side $a$, and five-twelfths of an inch from the junction of the lower side $a$ and right-hand side $b$, is an indicating-point 1. At the end of the side $a$, opposite the indicating-point 1, is an asterisk 2. On the left-hand side $c$, seven and one-half ($7\frac{1}{2}$) inches from the junction of the two sides, $a$ and $c$, is an indicating-point D, and a suitable distance above the point D is a second point M. On the lower side $a$, two and one-half ($2\frac{1}{2}$) inches from the junction of the sides $a$ and $b$, is a scale (marked K) composed of ten divisions of three-sixteenths ($\frac{3}{16}$) of an inch each. On the right-hand side $b$ is a scale (marked I) composed of five and one-quarter ($5\frac{1}{4}$) divisions of one inch each. The divisions (marked 11, 12, 13, and 15) are each subdivided into quarters, ($\frac{1}{4}$,) while the division 14 is divided into sixths ($\frac{1}{6}$) and marked scale A, and the quarter division above the division 15 is marked H. On the upper side, at a point two and one-twelfth inches ($\frac{1}{12}$) from its junction with the side $b$, is a scale B, composed of six divisions of one-quarter ($\frac{1}{4}$) of an inch each. On the left-hand side $c$, at a point seven-eighths ($\frac{7}{8}$) of an inch from the junction of the sides $a$ and $c$, is a scale L, composed of ten divisions of one-third ($\frac{1}{3}$) of an inch each.

At a point three and one-third ($3\frac{1}{3}$) inches from the lower side $a$ and one and one-half ($1\frac{1}{2}$) inches from the right-hand side $b$ is the lower end of the scale J, which extends in an oblique direction to a point three-quarters ($\frac{3}{4}$) of an inch from the top side $d$ and two and one-half ($2\frac{1}{2}$) inches from the right-hand side $b$. This scale J is composed of four divisions of one and one-quarter ($1\frac{1}{4}$) inches, each subdivided into fourths ($\frac{1}{4}$).

At a point three and one-third ($3\frac{1}{3}$) inches from the lower side $a$ and one and three-quarter ($1\frac{3}{4}$) inches from the side $b$ is a scale G, extending in an oblique direction and parallel to the scale J to a point within one-half ($\frac{1}{2}$) of an inch of the top side $d$ and two and three-quarter ($2\frac{3}{4}$) inches from the right-hand side $b$. This scale G is divided into five divisions of one inch each, subdivided into fourths. The space Q between the scales G and J is cut away to allow the points to be marked on the material O, beneath the outline.

At a point three and one-sixth ($3\frac{1}{6}$) inches from the lower side $a$ and an equal distance from the right-hand side $b$ is the lower point of the scale F, extending in an oblique line to a point one and five-twelfths ($1\frac{5}{12}$) inches from the top side $d$ and one and one-sixth ($1\frac{1}{6}$) inches from the left-hand side $c$. This scale F is composed of five (5) divisions of one inch each, subdivided into fourths ($\frac{1}{4}$). A space $f$, similar to the space Q, is cut away on the right-hand side of the scale F. The scale E, beginning at a point one and two-thirds ($1\frac{2}{3}$) inches from the lower side $a$ and three and one-sixth ($3\frac{1}{6}$) inches from the right-hand side $b$, extends in an oblique direction to a point one-half ($\frac{1}{2}$) of an inch from the left-hand side $c$ and four and five-sixths ($4\frac{5}{6}$) inches from the top side $d$. This scale E is composed of four (4) divisions of ten-twelfths ($\frac{10}{12}$) of an inch each, divided into fourths, and has a space $e$ cut away on the right-hand side similar to the spaces $f$ and Q.

At a point seven and one-quarter ($7\frac{1}{4}$) inches from the lower side $a$ and one and three-quarters ($1\frac{3}{4}$) inches from the left-hand side $c$ is the lower point of the scale C, extending in an oblique line to a point one and one-quarter inches from the left-hand side $c$ and one-half inch from the top side $d$. This scale C is composed of four (4) divisions of four-twelfths ($\frac{4}{12}$) of an inch each, subdivided into halves and having a space $c'$ cut away on the right-hand side similar to the spaces Q $f$ $e$.

To outline a coat or vest on the material, a straight line Z is drawn along the edge of the cloth for the purpose of squaring by. The lower side $a$ of the chart is placed on the straight line Z, so that the point 1 and the asterisk *[2] rest upon it. Now mark the points: 1, $A^{12\frac{1}{2}}$, $B^{12\frac{1}{2}}$, $C^{12\frac{1}{2}}$, and D. The distance from 1 to A gives the width of top of back. The point B gives the lower-shoulder point, and the distance from A to C gives width of back at shoulder. From the point D while the chart is in its first position draw a straight line D M with the side $c$ as a guide, and now place the corner formed by the junction of the sides $a$ and $b$ on the point D and square the chart by the line D M. Now mark the points $E^{12\frac{1}{2}}$, $F^{12\frac{1}{2}}$, and $G^{12\frac{1}{2}}$, which will give the initial points for the scye or armhole, and mark the point H, and from the point H mark forward, as at D M, for a second shift. Now place the asterisk or corner formed by the junction of the sides $a$ and $c$ on the point H and square the chart by the line drawn forward from H and mark the points $1^{12\frac{1}{2}}$ and $J^{12\frac{1}{2}}$, which will give the initial points for the upper shoulders and gorge, respectively. Now draw construction-lines from 1 to A, A to C, B to 1, and 1 to J and through the points C, E, F, G, and B and the sketch in the outline or proper curvature of the coat at and above the shoulder. It will thus be seen that only the initial points are located by my improved system, after which the construction-lines are sketched in by means of a straight edge and then the proper curves drawn. It will also be noticed that the combination of the point 1 and scale A gives the points for the width of the back. The combination of the point 1 and scale C gives the width of the back at the shoulder. The scale B locates the lower-shoulder point and the combination of the scales E, F, and G give the scye or armhole points, while the scale I gives the upper-shoulder point and the point J gives the gorge.

To fit a sleeve to the scye, measure from B around to C, or from C around through E F G to B on coat-draft. This will give for a twelve and one-half shoulder measure an eighteen scye measure. Now draw a squaring-line P similar to the squaring-line Z for the shoulder and back and square the chart thereon, marking the corner formed by the junction of the sides $a$ and $b$ O'. From the side $b$ mark off on the scale K the point 18, and measure along the side $b$ from the side $a$ one and one-fourth inches, marking it $O^2$. Square across from the point 18 on the scale K and mark the line 18 $k$. Now from the point O' measure to this line 18 $k$ (one-half of 18) or 9. This will give the point $d'$ for the front of sleeve. Square down from this point $d'$ by corner M and mark 18 on scale L. Draw a line from this point to the initial point O', cutting the line 18 $k$ at $f'$. Now sweep from O' to $d'$ and from the point $O^2$ one and one-fourth inches. From the point O' sweep around to $d'$, crossing the line 18 $k$ three-fourths of an inch forward of $f'$ and dropping one and one-eighth inch below the line 18 $k$.

Having thus fully described my invention, what I claim as new is—

1. A chart for drafting garments, comprising a rectangular strip having extending from a point near its top edge an oblique slit $c'$, with a scale C arranged upon one side thereof, the lower edge $a$, provided with an indicating-point 1, the right-hand side $b$ with a scale A, and the upper edge with a scale B, the latter for locating the lower-shoulder point, and the distance from A to C determining the width of the back at the shoulder, substantially as set forth.

2. A chart for drafting garments, comprising a rectangular strip having series of oblique slits Q, $f$, and $e$, with scales or graduated marks G, F, and E upon the left thereof for indicating the initial points for the scye, substantially as set forth.

3. A chart for drafting garments, comprising a rectangular strip having a scale I upon its right-hand side and an oblique slit Q extending from a point near its top edge, said slit having arranged upon the right-hand bordering edge a scale J, given points upon the scales I and J determining the initial points for the upper shoulders and gorge, substantially as set forth.

4. A chart for drafting garments, comprising a rectangular strip having a series of oblique slits Q, $f$, and $e$, with scales or graduated marks G, F, and E upon the left-hand bordering edge for indicating the initial points of the scye, said chart also provided at its lower edge $a$ with a scale K and upon its left-hand edge with a scale L, said last-named scales determining the points for fitting the sleeve to the scye, substantially as set forth.

5. A chart for drafting garments, comprising a rectangular strip having an oblique slit Q, with graduated marks upon the opposite bordering sides of said slit, and also having a series of similar-shaped slits $c'$, $f$, and $e$, with graduated marks upon one bordering side, the lower edge $a$ of the chart provided with a scale K and indicating-points 1 and 2, the right-hand side or edge with a scale A, the upper edge with a scale B, and the left-hand edge with indicating-points M and D and the scale L, substantially as set forth.

Toronto, August 19, 1890.

HENRY GORMAN KENNEDY.

In presence of—
GEORGE E. LUCAS,
CHARLES H. RICHE.